United States Patent [19]
Bassett

[11] Patent Number: 4,533,297
[45] Date of Patent: Aug. 6, 1985

[54] ROTOR SYSTEM FOR HORIZONTAL AXIS WIND TURBINES

[76] Inventor: David A. Bassett, 1708 Corwin Dr., Silver Spring, Md. 20910

[21] Appl. No.: 418,554

[22] Filed: Sep. 15, 1982

[51] Int. Cl.³ ............................................. F03D 1/06
[52] U.S. Cl. .................... 416/132 B; 416/11; 416/196 A; 416/237
[58] Field of Search ............... 416/132 B, 11, 196 A, 416/88, 141, 132 R, 132 A, 237 B, 238

[56] References Cited

U.S. PATENT DOCUMENTS

| | | | |
|---|---|---|---|
| 1,820,529 | 8/1931 | Darrieus | 416/196 A |
| 2,108,417 | 2/1938 | Stanley | 416/132 R |
| 2,505,969 | 5/1950 | Jacobs | 416/236 A X |
| 2,661,068 | 12/1953 | Gaskill | 416/196 A X |
| 2,918,128 | 12/1959 | Mallinckrodt | 416/132 R |
| 3,038,543 | 6/1962 | Davidson | 416/236 A X |
| 3,227,221 | 1/1966 | You | 416/132 R X |
| 3,891,347 | 6/1975 | Jacobs et al. | 416/169 B X |
| 4,025,230 | 5/1977 | Kastan | 416/11 X |
| 4,065,225 | 12/1977 | Allison | 416/169 B X |
| 4,093,402 | 6/1978 | Van Holten | 416/236 A |
| 4,137,010 | 1/1979 | Stroub | 416/132 R X |
| 4,197,056 | 4/1980 | Hütter | 416/132 B |
| 4,201,514 | 5/1980 | Huetter | 416/132 B X |
| 4,281,965 | 8/1981 | Stjernholm | 416/169 B X |
| 4,310,284 | 1/1982 | Randolph | 416/132 B |
| 4,316,699 | 2/1982 | Schott et al. | 416/237 B X |
| 4,335,996 | 6/1982 | Ross | 416/41 A X |
| 4,348,154 | 9/1982 | Ducker | 416/11 X |
| 4,431,375 | 2/1984 | Carter et al. | 416/11 X |

FOREIGN PATENT DOCUMENTS

| | | | |
|---|---|---|---|
| 2739297 | 3/1948 | Fed. Rep. of Germany | 416/132 B |
| 2909781 | 9/1980 | Fed. Rep. of Germany | 416/196 A |
| 868278 | 12/1941 | France | 416/132 B |
| 908631 | 4/1946 | France | 416/169 B |
| 1000102 | 2/1952 | France | 416/132 B |
| 1078401 | 11/1954 | France | 416/10 |
| 1187166 | 9/1959 | France | 416/236 A |
| 2288877 | 5/1976 | France | 416/132 B |
| 2291378 | 6/1976 | France | 416/196 A |
| 2413566 | 8/1979 | France | 416/11 |
| 211766 | 2/1924 | United Kingdom | 416/171 |
| 823479 | 11/1959 | United Kingdom | 416/196 A |

*Primary Examiner*—Everette A. Powell, Jr.
*Attorney, Agent, or Firm*—Bernard, Rothwell & Brown

[57] ABSTRACT

A rotor system for horizontal-axis wind turbines is provided having compound coning and a sweep angle to improve the rotor system's yaw responsiveness and stability and to reduce vibration and stress. To further improve wind turbine performance and rotor durability blades with the load-bearing function and airfoil function separated are disclosed and are particularly useful in rotor systems having compound coning or compound coning and sweepback. The load-bearing function and support function of the rotor hub are separated to improve rotor system durability and to provide a rotor hub for use with a pitch change mechanism for altering the pitch of rotor system blades.

31 Claims, 4 Drawing Figures

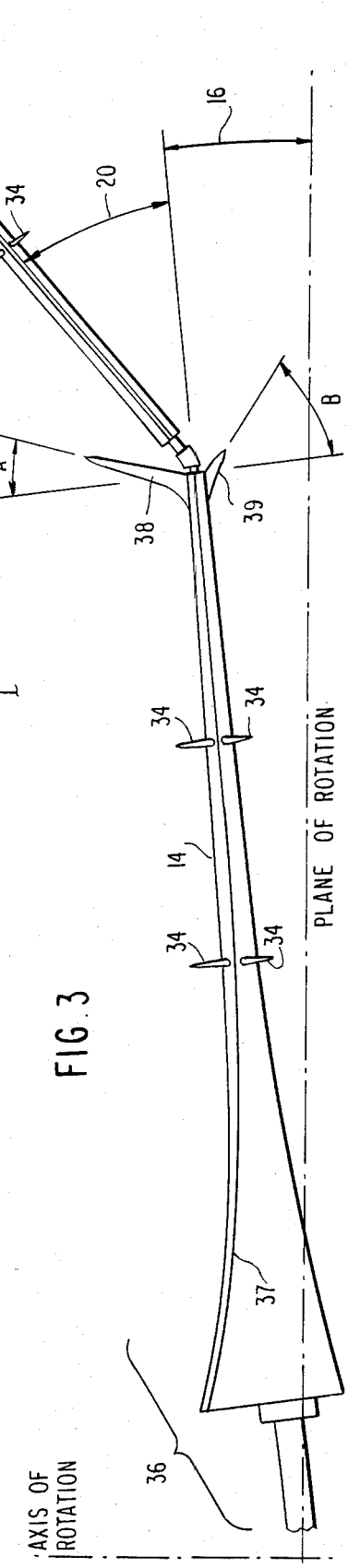

ROTOR SYSTEM FOR HORIZONTAL AXIS WIND TURBINES

BACKGROUND OF THE INVENTION

1. Field of The Invention a This application pertains to a rotor system for horizontal-axis wind turbines and to a blade structure, a rotor hub design and a pitch control system which enhance stability and improve the efficiency of horizontal-axis wind turbines.

2. Prior Art

A variety of wind turbine designs have been used to extract energy from wind, including both horizontal-axis and vertical-axis turbine systems. In typical horizontalaxis turbines, a nacelle enclosing power-transmitting mechanisms, electrical equipment and supporting a rotor system at one end, is mounted on a vertical tower. Rotor systems for horizontal-axis wind turbines ordinarily include one or more blades attached to a rotor hub which turns a power-transmitting shaft in the nacelle. The nacelle, bearing the rotor system, typically pivots about the vertical tower to take advantage of wind from any direction. The pivoting about this vertical-axis in response to changes in wind direction is known as yaw or yaw response and the vertical-axis is commonly referred to as the yaw-axis. Horizontal-axis turbines include upwind turbines and downwind turbines. The blades of a downwind turbine rotor system are contacted by wind after the wind travels past the tower and nacelle while the blades of an upwind turbine rotor system are contacted by wind before the wind passes the tower and nacelle.

The blade cross-section is often aerodynamic and may be based upon any airfoil configuration that enhances the efficiency of the blade. As wind moves past the blades with enough speed to generate sufficient lift to overcome inertial and drag forces, the rotor system rotates and the wind turbine converts the wind energy into electrical or mechanical energy for performing useful work.

Effective use of horizontal-axis wind turbines has been hindered by a number of problems, including excessive vibration and inadequate ability to position the rotor system properly relative to the mean wind direction. When a rotor system is not properly positioned with reference to the mean wind direction, the efficiency of the rotor system is significantly reduced. Proper positioning requires that the axis of rotor rotation be as nearly parallel to the mean wind direction as possible. When an angle of separation develops between the mean wind direction and the axis of rotor rotation, the power output of the rotor system, and therefore of the turbine, decreases. As the angle of separation increases, the decrease in power output is proportionally greater.

Conventional rotor systems tend to move unstably in response to changes in mean wind direction during operation by hunting for a proper yaw position relative to a new mean wind direction, rather than stably tracking such changes. Transient wind direction changes or wind gusts pivot the rotor system of typical wind turbines away from a proper yaw position and the system then hunts for a proper position relative to the mean wind direction when the transient wind direction dissipates. Hunting motions involve the back and forth movement of the axis of rotor rotation through the mean wind direction cyclically creating undesirable separation angles. For good yaw response a rotor system should stably track changes in mean wind direction rather than hunting for the proper position and should minimize hunting motions in response to transient wind direction changes In addition to decreasing the power output by causing separation angles, unstable hunting motions result in undesirable vibration and stress. Blade fatigue and ultimate failure of the blade near its root is directly related to the number of hunting motions and the speed at which they occur. Rapid changes in yaw dramatically increase the forces acting against the rotational inertia of the entire rotor system, magnifying the bending moments at the blade root. Over time, additional stress cycles caused by hunting motions weaken blades near the blade root resulting in blade fatigue, decreasing equipment life and dependability.

Mechanisms for controlling yaw and yaw rate have been devised but none have provided adequate economical solutions to the problems associated with inadequate yaw response and stability. For instance, upwind turbines and some downwind turbines, use tailvanes which act as rudders to keep the rotor system positioned into the wind but these have not proven to be effective mechanisms for minimizing separation angle or the hunting movements that occur during yaw changes, particularly when used with downwind turbines. Electrically-powered yaw-drive systems have been used but these require additional energy and complex mechanisms that are subject to failure during operation. Some designs for downwind turbines position the aerodynamic center and the center of mass of the rotor system at a greater distance from the yaw axis than is needed for tower clearance in an attempt to cause the entire rotor system and the portion of the nacelle between the yaw-axis and the rotor system to behave like a tailvane. But increasing the distance between yaw-axis and the center of rotor mass magnifies bending moments on the blades during yaw and increases stress and vibration on the tower and rotor system. Excessive vibration and stress require more massive tower design and cause fatigue in the rotor hub and blade root thereby decreasing the useful life of the equipment and reducing dependability.

Many other sources of vibration hinder effective use of horizontal-axis wind turbines. For instance, blade motion in response to gyroscopic forces, wind shear, wind gusts and even blade balance, results in vibrations and cyclic motions not only in the blades, but in the rotor hub, the tower, bearings, and other components of a wind turbine as well. These vibrations and blade motions reduce the life and reliability of the affected components, and the performance of the equipment. This in turn decreases the cost-effectiveness of the wind turbine and its economic appeal.

Tower shadow is another source of destructive vibration that has attended downwind horizontal-axis wind turbines. Tower shadow refers to turbulence in air flow and a general reduction in wind velocity caused by the interference of the tower as the wind passes by. In downwind turbines, tower shadow causes each blade to encounter turbulence and lower wind velocity, and therefore lesser wind forces, as a blade moves through the sector of its rotation behind the tower. As a blade moves through the sector of its rotation above the tower, where the air flow has not been disrupted by the tower, less turbulence, higher wind velocity, and greater wind forces are encountered. Alternatively subjecting blades to greater and then lesser wind forces combined with lesser and then greater turbulence, results in unwanted vibrations and fluctuating stresses which worsen as the obstruction presented by the tower increases.

Blade design is another factor affecting the vibrations and stresses to which a wind turbine is subjected. Blades are usually load-bearing airfoils attached to a rotor hub, each blade being independent of the others with no external supporting members. These blades may be made of materials which allow bending and torsion of the load-bearing airfoil, but such materials are often expensive, increasing the cost of wind turbines. Uneven deflection of load-bearing airfoils can cause imbalance of the blades and rotor system resulting in greater vibration and stress on the entire turbine and tower structure. Some rotor designs use a slight coning angle at the blade root, usually 3–5 degrees, in an attempt to balance centrifugal and thrust forces which act upon a spinning rotor. Other systems, primarily upwind turbines, use no coning angle but may use struts strong in tension to connect each blade to a common point at some distance upwind of the rotor blades. These struts help prevent the wind thrust forces from snapping the blade at its root or forcing the blades into the tower. For some downwind turbine systems, rigid struts strong in compression have been used to connect each blade near its midpoint to a common hub some distance downwind of the rotor blades to resist the snapping action of wind and aerodynamic thrust forces, but such struts are usually not used with downwind systems since the wind and aerodynamic thrust forces act to increase clearance between the tower and the rotor blades.

SUMMARY OF THE INVENTION

To overcome the problems of poor yaw response, yaw instability and excessive vibration, and to increase operating efficiency, applicant has provided a rotor system for horizontal-axis wind turbines having compound coning of blades relative to a reference plane of blade rotation which is perpendicular to the axis of blade rotation. In addition to compound coning, a sweep angle is provided to further improve the yaw response and yaw stability of horizontal-axis turbines and to increase overall operating efficiency.

A preferred rotor system incorporates compound coning and a sweep angle with rotor blades that have their loadbearing function separated from their airfoil function. The load-bearing function and the airfoil function of the blade are separated to enable changes in pitch to occur over the entire airfoil of a rotor system using compound coning and sweepback as well as the use of lightweight, complex-shaped airfoils. Separating the blade functions also reduces blade fatigue and rotor wear by allowing pitch change of the airfoil independent of the load-bearing structure. The support function and power-transmitting function of the rotor hub are also preferably separated to allow use of a compound coning pitch change mechanism which improves rotor operation at various wind speeds. Separating the load-bearing function and the power-transmitting function of the rotor hub also reduces stress in the rotor hub and rotor-support.

BRIEF DESCRIPTION OF THE DRAWINGS

FIG. 1 is a schematic side view of a nacelle, rotor system and tower made in accordance with applicant's invention.

FIG. 2 is a schematic view (looking upwind) of a rotor system made in accordance with applicant's invention having sweep-back.

FIG. 3 illustrates a blade assembly for use in applicant's having flow controllers.

DETAILED DESCRIPTION OF THE INVENTION

Figure 4:
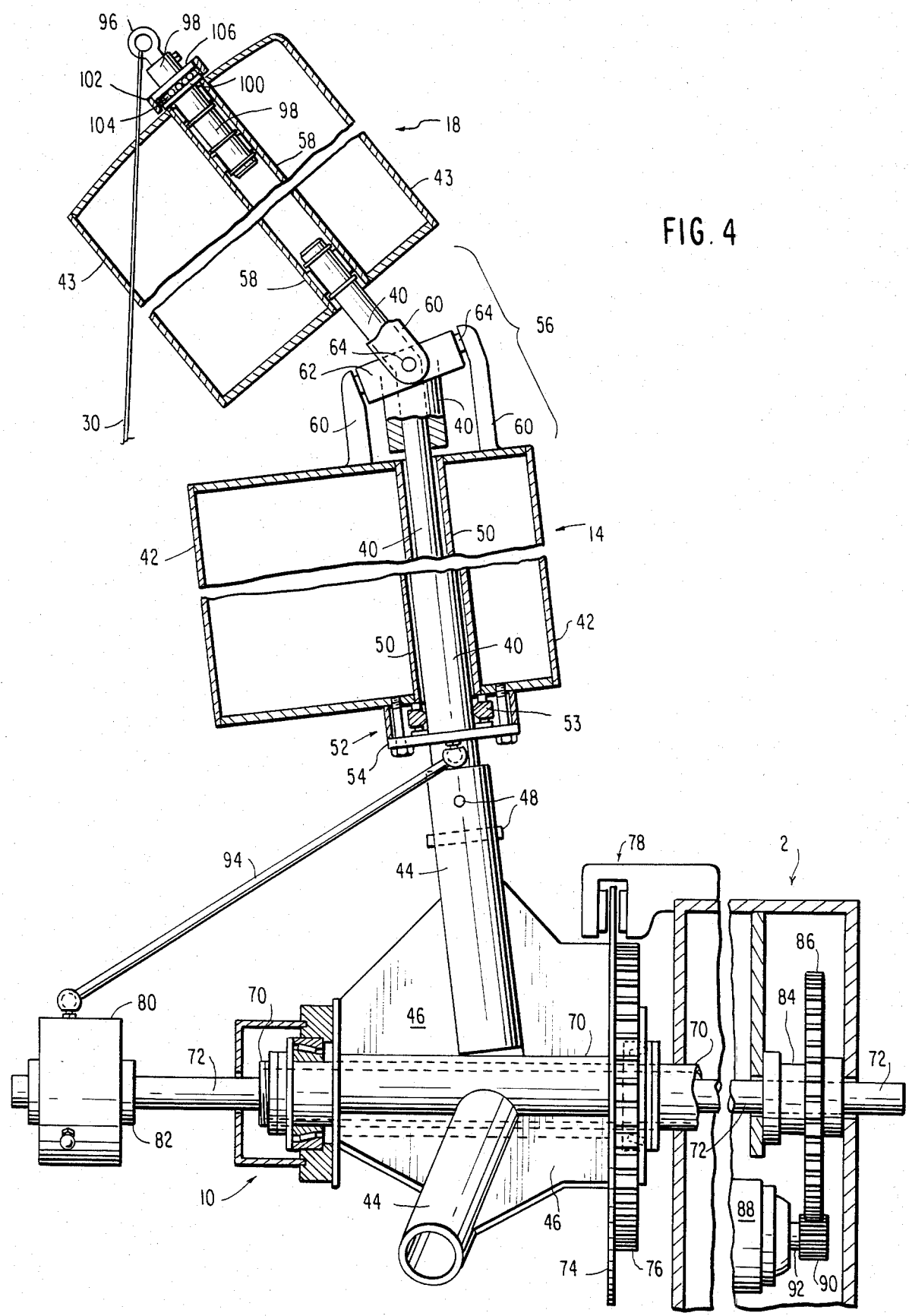
FIG. 4 illustrates a blade having the load-bearing function and airfoil function separated along with a pitch control system and a rotor hub having load-bearing and power-transmitting functions separated.

One embodiment of the applicant's invention is illustrated in connection with a downwind horizontal-axis wind turbine in FIG. 1, where a nacelle 2 is positioned on top of a tower 4. The nacelle 2 is free to pivot about yaw-axis 6, which is coaxial with tower 4. The nacelle supports a rotor system 8 which includes a rotor hub 10 and blade assemblies 12. The nacelle typically houses power-transmitting mechanisms and electrical equipment (not shown) for converting rotor system motion into mechanical or electrical energy.

To improve yaw tracking of changes in mean wind direction, yaw stability and to reduce vibrations and blade fatigue, each blade assembly 12 includes inner blade component 14 mounted on the rotor hub 10 at a first coning angle 16 and an outer blade component 18 at a second coning angle 20 which is greater than the first coning angle. The coning angles 16 and 20 are formed relative to a reference plane of blade rotation 22 which is perpendicular to the axis of blade rotation 24. The first and second coning angle 16 and 20 are preferably fixed but blade assembly 12 may be connected to the rotor hub 10 in a manner that permits free coning. With free coning, the first and second coning angles 16 and 20 change during operation in response to fluctuations in wind speed and centrifugal forces. The first coning angle 16 may even become zero relative to the reference plane of blade rotation 22. In the present invention, the first fixed coning angle 16 may range from about 0° to about 15° and is preferably about 3°–10°. The second coning angle is also preferably fixed and will be greater than the first coning angle up to about 60° but is preferably between 30° and 40°. It should be understood that blades are typically somewhat flexible and the term "fixed coning angle" must be read to account for the flexing of blades during operation in response to centrifugal and wind forces. In addition, the term "horizontal-axis wind turbines" includes wind turbines whose axis of rotation forms a slight angle of tilt relative to the horizontal, as illustrated by tilted axis of rotation 24'. The axis of rotation may be tilted to raise the rotor hub 10 to provide additional clearance between the blade assemblies 12 and the tower 4. This tilt angle may be up to 15° but preferably is about 6°.

Compound coning results in long-term economical operation and provides improved yaw stability and yaw response. A rotor system using applicant's invention stably tracks changes in mean wind direction without excessive hunting for the proper positioning because of the cone structure presented to the ambient mean wind. If the mean wind direction changes as the rotor system with compound coning spins, air strikes the rotor or from the side as well as from the front. Wind from a new direction strikes outer blade component 18 more squarely on the side of the rotor closest to the new wind direction (causing increased lift) than it does on the corresponding blade component 18 on the opposite side of the rotor (causing decreased lift). The increased lift acting at a great distance from the yaw axis creates a torque about the yaw axis to position the rotor properly with respect to the new wind direction. Similarly, decreased lift on the opposite side of the rotor produces supplementary torque to aid in yaw response. The combination of these torques developed by the outer blade components produces a righting couple that positions the rotor system properly relative to the new mean wind direction. In a spinning rotor, this aerodynamic righting couple is cushioned by inertial forces and equilibrium is readily achieved with the rotor properly positioned relative to the mean wind without excessive or rapid hunting motions. With applicant's invention, the rotor system remains properly positioned relative to the predominating mean wind direction since the geometry provided by compound coning continuously generates aerodynamic forces that minimize the separation angle. By actively minimizing the separation angle between the mean wind direction and the axis of rotation, the power output of the turbine is maximized and overall performance is improved. Compound coning provides a righting couple during start-up conditions as well as during normal operation resulting in enhanced start-up responsiveness.

Yaw responsiveness and stability are further enhanced by sweep-back or sweep-forward, illustrated in FIG. 2. This is provided when the outer component 18 of the blade assembly 12 forms a sweep angle 26 or 28. The sweep angle may range from about 0° to about 60° but is preferably about 20°. The sweep angle 26 is a sweep-back angle, preferred for downwind horizontal-axis wind turbines. The term "sweep-back" indicates that as blade assembly 12 rotates counterclockwise (as viewed in FIG. 2), the outer component 18 of the blade assembly 12 is positioned to advance in rotation behind the leading edge of the inner component 14. Sweep angle 28 illustrated in FIG. 2, is a sweep-forward angle which positions the outer component 18 of the blade assembly 12 to advance in rotation ahead of the leading edge of the inner component 14.

The sweep angle enhances yaw rate stability by responding to changes in the relative wind during rotor operation and minimizes hunting motions of the rotor in response to minor changes in winds. Relative wind is a vector sum of the mean ambient wind and the apparent wind due to rotation of the rotor system. Since the speed of rotation at the blade tip may be typically 5 to 7 times greater than the ambient wind speed, the speed of a blade in the plane of rotation dominates the vector addition. Sweeping outer blade component 18 minimizes the effect of transient wind changes since the outer component progressively intercepts the relative wind which is greatly smoothed by the vector addition. The prolonged contact between the relative wind and the outer component 18 increases the stabilizing effect by using the apparent wind of rotation and the inertia of the rotating blades to smooth out fluctuations in the ambient wind direction.

Lasting changes in the mean wind direction cause changes in the direction of the relative wind, resulting in passage of a greater volume of air over the swept portion of the blade on the side of the rotor system closest to the new wind direction than passes over the opposite side of the rotor system. The difference in forces across the rotor system causes the rotor system to respond in yaw to lasting changes in mean wind direction. This response is maximized since the relative wind causing lift is acting over the greatest possible distance to produce a corrective torque about the yaw axis 6. The decreased relative wind and decreased lift on the side of the rotor system furthest from the new wind direction complements the increased lift on the side of the rotor system closest to the new mean wind direction. These forces combine to form a righting couple which results in a rotor system which responds surely, smoothly and stably to changes in wind direction. With the present invention, the magnitude of stresses are reduced by controlling yaw rate; and the number of stress cycles are reduced by smooth tracking of changes in mean wind direction which bring the rotor system into a proper yaw position. These improvements increase the useful life of the rotor system, tower and components, improve the performance of the turbine, and permit the use of less expensive construction materials.

The rotor geometry of the present invention also enables the use of longer blades in a given space than is possible with rotors that do not employ this geometry since the first and second coning angles cause the blades to extend outward from the rotor hub 10 away from the tower 4 rather than extending from the hub 10 in a substantially parallel relationship with the tower 4. This permits the use of a larger rotor diameter which increases the amount of energy that can be extracted from the wind.

This geometry of applicant's rotor system also reduces tower shadow by enabling the use of a lightweight slender tower 4 to support the nacelle 2. Since the blades of the rotor system are directed away from the tower by two coning angles, sufficient room between the outer components of the blade and the tower is available to permit the placement of tower supports 25, preferably cables, higher on the tower than is possible with conventional rotor systems. Placement of supports 25 higher on the tower gives greater strength to a tower, enabling the use of a slender tower. The use of a slender tower, preferably reinforced at stress points to enhance its strength, reduces tower shadow and the resulting turbulence and variations in wind forces that otherwise act to cause destructive vibration. Reduced variation of fluctuating forces reduce stress on the rotor system thereby enhancing rotor life, dependability and efficiency.

With applicant's invention, the distance between the tower 4 and the rotor system 8 can be minimized to reduce vibration and gyroscopic forces without sacrificing yaw responsiveness. Compound coning permits the distance between the yaw axis and the center of mass of the rotor system to be minimized while the distance between the yaw axis and the aerodynamic center of the rotor system may be maximized to enhance yaw response. This feature lessens vibrations and unwanted forces that result from spacing the mass of the rotor system at a greater distance from the yaw axis while improving yaw responsiveness and enhancing yaw stability. These advantages act simultaneously to improve equipment wear rates and permit the use of less expensive components.

A preferred embodiment of applicant's invention for downwind horizontal-axis turbines, illustrated in FIGS. 1 and 2, takes advantage of compound coning to further stabilize the rotor system and to reduce vibration by using outer support lines 30 to connect blade tips 31 to each other. Inner support lines 32 may also be provided to connect blades at the point where the second coning angle begins. The lines are preferably made of steel cable or other material capable of withstanding tension during operation of the wind turbine. This feature of applicant's invention distributes force fluctuations and stresses caused by wind shear or tower shadow more uniformly over the entire rotor system than other systems which use independent blades or struts extending from blade centers to points of support. The lines give support to the blades at their tips against centrifugal forces and wind variations that cause the blades to move into the wind towards the tower or bend in response to erratic wind conditions. The blades are therefore supported at their tips and at the rotor hub 10 to which the blades are connected. With these two points of support each blade acts as a beam supported at each end rather than as a lever when the blade is acted upon by the various forces described above. The reduced blade fluctuation and the additional support provided by the lines 30 and 32 enable the use of lighter materials which further enhance turbine efficiency and improve wear rates of the rotor system.

The combination of compound coning and a swept outer airfoil offer an important advantage by allowing more precise control over the atmospheric conditions in the near vicinity of the rotor system. Such control provides for enhanced power extraction from a free-flowing windstream approaching the rotor system. By presenting the applicant's rotor with compound coning and swept airfoils to the free-flowing windstream, a greater increment of time will be required for the wind to traverse the doubly-coned rotor system. The windstream moving through the rotor system intercepts the cone in a series of expanding concentric circles as the wind reaches downwind portions of the rotor. This delay in meeting the full diameter of the rotor system controls and smooths atmospheric conditions immediately upwind and downwind of the rotor. The smoother transition of a unit volume of the windstream through the rotor diminishes the build-up of pressure just upstream of the rotor and provides a more gradual pressure energy drop as the unit volume of windstream passes through the rotor. The reduced pressure energy just upwind of the rotor permits the velocity of a unit volume of air to remain at or near the free-stream velocity, rather than decreasing as it approaches the rotor as with conventional rotor systems. This greater wind velocity reaching the turbine has more kinetic energy which may be imparted to the rotor as the wind passes through the rotor system, thereby enhancing turbine power output. In addition, the cross-sectional area of the windstream that passes through the rotor is proportional to its velocity. Since the wind velocity immediately upwind of the rotor is more nearly the freestream velocity, the original area of air brought to the rotor is greater than with conventional rotor systems. The greater the free-stream area that can be captured by a given rotor diameter, the greater will be the power output. With these advantages, applicant's rotor system enhances power extraction by controlling the atmospheric conditions immediately upwind of the rotor and within the downwind rotor wake.

The embodiments of applicant's invention illustrated in FIGS. 1 and 2 show blades having two separate components connected to one another. While this represents a preferred embodiment of applicant's invention, each blade could be one continuous curved elastic member. The term components therefore includes a continuous blade molded to form a rotor system having compound coning when the blade is mounted on a rotor hub. Blades having three or more components forming three or more angles could also be provided without departing from applicant's invention of compound coning or compound coning with sweepback.

The efficiency of rotor systems having compound coning or compound coning and sweep-back or sweep-forward may be enhanced by aerodynamic flow controllers on the blade airfoil surfaces as illustrated in FIG. 3. A blade assembly 12 having two separate components 14 and 18 is shown with flow control fences 34 attached to each airfoil on both upper and lower aerodynamic surfaces to reduce formation of wind vortices that move from root 36 of the blade toward the blade tip 31. An advantage provided by the flow control fences is reduced vorticity shed at the trailing edge 37 of the airfoil, the tip 31 of the blade and at the end of the inner blade component. Low pressure winglets 38 and high pressure winglets 39 are provided to enhance wake control and help concentrate air into the rotor blades. Low pressure winglets 38 are located on the upper surface (low pressure side) of the airfoil and are canted toward the blade tip by angle A which may range from 0° to 45° from a line perpendicular to the longitudinal axis of the blade. Angle A is preferably about 15°. The high pressure winglets 39 are located on the high pressure upwind side of the airfoil and are positioned closer to the leading edge of the airfoil than winglets 38. High-pressure winglets 39 are canted toward the blade tip by angle B which may range from 0° to 75° from a line perpendicular to the longitudinal axis of the blade. Angle B is preferably about 55°. The net result of using flow control devices such as these preferred embodiments is improved turbine performance. While the flow control fences and winglets are most useful when used with blades having the airfoil function separated from the load-bearing functions, their use is not limited to a rotor system with compound coning or to blades having separated functions.

A preferred blade for use in applicant's invention separates the load-bearing function of a blade from the aerodynamic function of the blade as illustrated in FIG. 4. When these two functions of a rotor blade are separated, aerodynamic and centrifugal bending forces are absorbed by load-bearing spar 40, while aerodynamic forces are generated by inner airfoil 42 and outer airfoil 43. To achieve this separation of function, load-bearing spar 40 extends the length of inner blade component 14 and into outer blade component 18. Airfoils 42 and 43 surround the load-bearing spar 40 and are free to rotate about it. Main spar 40 is preferably rigidly mounted on the rotor hub 10. This mounting may be accomplished by inserting the load-bearing spar 40 into rotor stub tube 44. In the illustrated embodiment, rotor stub tube 44 is preferably welded to primary coning plates 46 and main spar 40 is pinned to rotor stub tube 44 by anchor pins 48 for easy assembly and disassembly under field conditions. Other methods of assembling these parts together may be used, including the use of molded parts, so long as the necessary strength and rigidity is provided to withstand the stresses created by wind acting on the blades and transmitted through the load-bearing spar 40 to the rotor hub 10. Since the airfoils 42 and 43 do not have to withstand most of the stresses encountered during operation of the wind turbine, they can be made of light-weight material, reducing construction costs and vibrations resulting from blade movement and blade weight. In addition, flow control devices may be added as part of the airfoil without reducing or compromising the strength and structural integrity of the blade.

To permit free rotation of the inner airfoil 42 about the load-bearing spar 40, the spar 40 is surrounded by inner airfoil tube 50. Between tube 50 and main spar 40, grease or some other lubricating packing material is provided to enable the inner airfoil tube 50 to rotate freely about the load-bearing spar 40. Tube 50 is attached to the inner airfoil 42 by any manner suitable for the materials used to form the airfoil. To enhance free movement and pitch change of the inner airfoil 42 about the main spar 40, main pitch bearing housing 52 contains bearings and thrust plate 53 which is attached to the load-bearing spar 40. Bearing plate 54 is affixed to airfoil 42 with bolts or pins extending through the main pitch bearing housing 52. Thrust plate 53 not only absorbs outward centrifugal forces but also prevents the movement of the airfoil 42 down the load-bearing spar 40 towards the rotor hub 10 due to the force of gravity when the rotor is parked.

The load-bearing spar 40 extends from rotor hub 10 through the length of the first component 14, through compound coning joint 56, and into the second component 18. The diameters of load-bearing spar 40 and inner airfoil tube 50 preferably decrease as they extend away from the rotor hub 10 as illustrated in FIG. 4. Load-bearing spar 40 is, however, one continuous spar or separate members welded together to form one continuous spar. Outer airfoil tube 58 rotatably surrounds the load-bearing spar 40 in the outer airfoil 43 to permit free rotation of the outer airfoil 43 about the main spar 40. With the loadbearing functions and airfoil functions of both blade components separated, lighter weight materials may be used in the construction of the airfoils 42 and 43. In addition, airfoil pitch may be adjusted independently of the loadtransmitting and load-bearing structures.

The compound coning connector assembly 56 includes rigid coning yokes 60, rigidly mounted on and extending from adjacent ends of inner and outer airfoils 42 and 43. The rigid yokes are attached to a connector ring 62 by yoke pins 64 to form the second rigid coning angle. The load-bearing spar 40 passes through the connector ring 62 without touching the connector ring or the rigid yokes 60. With this compound coning connector, any pitch change of airfoil 42 caused by a pitch control mechanism (described below) is transmitted directly to the outer airfoil 43 by coning yokes 60 attached to the connector ring 62. When the pitch of airfoil 42 is altered, the pitch of the outer airfoil 43 is therefore modified to the same degree as the pitch of airfoil 42.

As illustrated in FIG. 4, rotor hub 10 is itself supported by structural rotor support conduit 70. The structural conduit 70 does not rotate and is firmly affixed to the nacelle 2. Structural conduit 70 transmits no power to the nacelle but provides excellent mechanical support for the rotor system and allows the passage and movement of pitch control rod 72. To transfer the rotary motion of the rotor system to power-generating equipment in the nacelle, brake disk 74, with main gear 76 mounted on it, is attached directly to the primary coning plates 46. The primary coning plates 46, brake disk 74 and main gear 76 referred to as the rotor power-transmitting elements, rotate about said structural conduit 70. Power is transmitted from the main gear to a smaller gear and shaft (not shown) which in turn transmit rotary power to the nacelle. Although a main gear mechanism is illustrated, a frictional drive system or a pulley and belt system including synchronous belts may be used instead of main gear 76 to transmit rotational energy to the smaller shaft. By extracting power from the rotor with a large gear or pulley instead of by turning a central shaft, the speed of the shaft transmitting power to the nacelle is increased. The size and weight of the shaft transmitting power may therefore be reduced. Higher shaft speed is also desirable for electricity production since the operating range of most common alternators or generators is above the operating range of the rotor.

The immobile structural conduit 70 separates load-bearing and power-transmitting functions normally performed in typical turbines by a single, large, solid mainshaft that transmits torque and absorbs shocks. Structural conduit 70 provides only mechanical support for the rotor assembly. Separating the mechanical and power-transmitting functions improves durability of the rotor hub by enabling the use of lighter-weight tubing and the use of control rod 72 for adjusting pitch of the airfoils 42 and 43. In addition, brake caliper 78 acts on the outer periphery of the brake disk 74 to reduce stress and improve safety during braking. The placement of the brake caliper at the rotor hub improves the safety and durability of the rotor system, since excessive reverse torques caused by braking are not placed on high speed shafts, bearings, gears, pulleys or other power-transmitting components, as is done in conventional horizontal-axis wind turbines.

The controlled movement of airfoils 42 and 43 about load-bearing spar 40 is preferably accomplished by a pitch change mechanism used with a rotor hub having load-bearing and power-transmitting functions separated. As illustrated in FIG. 4, pitch control rod 72 extending through nacelle 2 and beyond rotor hub 10 supports pitch control collar 80. The pitch control collar 80 is rotatably attached to rod 72. Bearings (not shown), contained in bearing housing 82, allow collar 80 to rotate freely about rod 72. Pitch control rod 72 does not rotate, but moves longitudinally back and forth within rotor support conduit 70 extending through the rotor hub 10 and the nacelle 2. To produce longitudinal motion, rod 72 is threaded through a threaded collar 84 in pitch gear 86 so that lateral motion of pitch control rod 72 is produced when the pitch gear 86 rotates. The rotation of pitch gear 86 is caused by pitch drive motor 88 which is activated by a sensing device and a microprocessor (not illustrated) which sense wind velocity and rotor speed. When wind velocity or rotor speed reaches a level that may cause damage to equipment, pitch drive motor 88 is energized, rotating pitch change pinion 90 mounted on pinion shaft 92. Longitudinal movement of pitch gear 86 is constrained by bearings (not shown) within threaded collar 84.

The lateral motion of the rod 72 is transmitted to the inner airfoil 42 and the outer airfoil 43 to alter their pitch, by pitch linkage 94 connected to the collar 80 and the base of inner airfoil 42. The pitch linkage 94 is preferably a rigid member extending from collar 80 to the base of airfoil 42 at a point off-center of the bearing plate 54. As the rod 72 and collar 80 move laterally away from rotor hub 10 or toward rotor hub 10, the motion is transmitted to inner airfoil 42 and outer airfoil 43 causing the angle at which both airfoils attack the wind to change. With this pitch control mechanism, the airfoil can be positioned so that it extracts less energy from the wind when peak rotational speed or generator capacity have been reached. The wind turbine can therefore continue to operate at safe speeds in high winds that damage rotor systems that lack such a pitch change capability.

As noted above, lines 30 may be connected to blade tip 31 as illustrated in FIGS. 1, 2 and 4. In FIG. 4, line 30 is attached to support ring 96 which is in turn rigidly attached to outer stub spar 98 extending into outer airfoil tube 58. The outer airfoil tube 58 is attached (preferably by welding) to inner thrust plate 100. Bearing tube 102 containing thrust bearings 104 is rigidly attached to outer stub spar 98 and outer thrust plate 106 forming a rigid assembly. This construction permits airfoil 43 to rotate freely about stub spar 98 and loadbearing spar 40.

When blades having the load-bearing and aerodynamic functions separated in the manner illustrated in FIG. 4 are used in combination with a rotor system having compound coning or compound coning combined with sweep-back or sweep-forward, a particularly useful and efficient rotor system is provided. Using such blades in combination with a pitch change mechanism and a rotor hub having the power-transmitting function and load-bearing function separated, as illustrated in FIG. 4, provides a durable rotor system that can operate economically even in high winds that would damage conventional rotor systems. It should be noted, that a blade having separated functions could be used in any wind turbine, even those which do not use compound coning or sweep-back or sweep-forward. However, the use of a blade having separated functions is a preferred embodiment of applicant's invention which makes the use of a multi-component blade having compound coning and sweep-forward or sweep-back particularly attractive.

What is claimed is:

1. A rotor system for horizontal-axis wind turbines, including a rotor hub, a blade having an inner component mounted on said rotor hub to form a first fixed coning angle relative to a reference plane of blade rotation and an outer component extending from said inner component and ending in a blade tip, said outer component forming a second fixed coning angle greater than said first coning angle relative to said reference plane of blade rotation.

2. A rotor system as recited in claim 1 wherein said outer component forms a fixed sweep angle relative to the direction of rotation of said rotor hub.

3. A rotor system as recited in claim 1 or 2 and further including a compound coning connector and wherein said inner and outer components are separate components connected to each other by said compound coning connector.

4. A rotor system as recited in claim 1 wherein said rotor system includes three blades and support lines connecting adjacent blade tips.

5. A rotor system as recited in claim 4 and further including support lines connecting adjacent blades at a point between said inner and outer components.

6. A rotor system as recited in claim 3 wherein said first coning angle is fixed between about 0° and about 15°, and said second coning angle is fixed, said second coning angle being greater than said first coning angle but less than about 60° relative to said reference plane of blade rotation.

7. A rotor system as recited in claim 6 wherein said second component forms a sweep angle of between about 0° and about 60°.

8. A rotor system as recited in claim 7 wherein said first coning angle is between 3° to 10°; said second coning angle is between 30°–40° and said sweep angle is about 20°.

9. A rotor system as recited in claim 1 wherein said rotor system axis is tilted at an angle up to 15° relative to the horizontal.

10. A rotor system as recited in claim 9 wherein said rotor system axis of rotation is tilted at about 6°.

11. A rotor system as recited in claim 1 2 or 3 wherein said blade further comprises a load-bearing spar for mounting said blade onto said rotor hub and for absorbing forces on said blade during operation of said rotor system; said load-bearing spar extending through said inner component and into said outer component; and wherein said inner component further comprises an inner airfoil rotatably attached to said load-bearing spar for generating aerodynamic forces; and said outer component further comprises an outer airfoil rotatably attached to said load-bearing spar for generating aerodynamic forces.

12. A rotor system as recited in claim 11 wherein flow controllers are positioned on said inner airfoil and said outer airfoils.

13. A rotor system as recited in claim 12 wherein said flow controllers comprise flow control fences attached to upper and lower surfaces of said inner airfoil and said outer airfoil.

14. A rotor system as recited in claim 13 wherein said flow controllers further comprise high pressure winglets disposed on the high pressure surface of said airfoils and low pressure winglets disposed on the low pressure surface of said airfoils.

15. A rotor system as recited in claim 11 wherein said compound coning connector comprises rigid yokes extending from adjacent ends of said inner component and said outer component; all of said rigid yokes being attached to a connector ring through which said load-bearing spar passes.

16. A rotor system as recited in claim 15 wherein said rotor system includes three blades and further includes support lines connected to the tips of said blades.

17. A rotor system as recited in claim 15 wherein said rotor system includes three blades and further includes support lines connected to adjacent blades at said compound coning connector.

18. A rotor system as recited in claim 15 wherein said inner component forms a fixed first coning angle of about 3° to about 10° relative to said reference plane of blade rotation, and said outer component forms a second coning angle greater than said first coning angle and less than about 60° relative to said reference plane of blade rotation.

19. A rotor system as recited in claim 17 wherein said outer component forms a sweep angle of between about 0° and about 60°.

20. A rotor system as recited in claim 19 wherein said wind turbine is a downwind horizontal-axis wind turbine and said sweep angle is a sweep-back angle.

21. A rotor system as recited in claim 1 wherein:
(a) said rotor hub includes a structural conduit extending through said rotor hub and supporting said rotor system;
(b) said rotor system further including rotor power-transmitting elements;
(c) said rotor power-transmitting elements being mounted for rotation about said structural conduit, whereby the power-transmitting and support functions of said rotor hub are independent of each other.

22. A rotor system as recited in claim 1 wherein said blade comprises:
(a) a load-bearing spar attached to said rotor hub;
(b) an inner airfoil and an outer airfoil rotatably mounted on said load-bearing spar;
(c) said inner air-foil and said outer air-foil having no primary load-bearing function whereby the load-bearing function and the airfoil function of said rotor system are independent of each other.

23. A blade as recited in claim 22, and further including a compound coning connector and wherein said inner airfoil and said outer airfoil are separate components of said blade, and wherein said inner airfoil and said outer airfoil are connected to each other by said compound coning connector.

24. A blade as recited in claim 22, wherein said compound coning connector comprises rigid yokes extending from adjacent ends of said inner component and said outer component, said rigid yokes being attached to a connector ring through which said loadbearing spar passes.

25. A blade as recited in claim 22 wherein said outer component ends in a blade tip comprising an outer stub shaft and a support ring attached to said outer stub shaft for receiving a support line.

26. A blade as recited in claim 22 and further comprising flow controllers positioned on said inner airfoil and said outer airfoil surfaces.

27. A blade as recited in claim 26 wherein said flow controllers comprise flow control fences attached to upper and lower surfaces of said inner airfoil and said outer airfoil.

28. A blade as recited in claim 27 wherein said flow controllers further comprise high pressure winglets disposed on the high pressure surface of said airfoils and low pressure winglets disposed on the low pressure surface of said airfoils.

29. The blade as recited in claim 28 wherein said high pressure winglets are canted toward the blade tip at an angle with a line perpendicular to the longitudinal axis of said blade which is in the range 0° to 45° and wherein said low pressure winglets are canted toward the blade tip at an angle with a line perpendicular to the longitudinal axis of said blade which is in the range between 0° and 75°0.

30. A rotor system as recited in claim 11 and further including means for sensing a condition, a pitch control mechanism mounted on said rotor hub and movable in response to said sensing means for rotating said airfoils about said load-bearing spar to positively vary the pitch of said blade.

31. A rotor system as recited in claim 30 wherein said pitch control mechanism comprises:
(a) a pitch control rod extending through said structural conduit and beyond said rotor hub, said rod being capable only of longitudinal movement;
(b) a pitch control collar rotatably mounted on said pitch control rod; and
(c) a rigid pitch linkage having one end attached to said collar and the other end attached to said inner airfoil of said inner component to transmit longitudinal movement of said rod to said airfoil of said inner component to change the pitch of said airfoil.

* * * * *